United States Patent [19]

McAloon et al.

[11] Patent Number: 4,539,046

[45] Date of Patent: Sep. 3, 1985

[54] PRODUCTION OF VERMICULITE PRODUCTS

[75] Inventors: Kevin T. McAloon; Iona E. Heeson; Gordon E. Cleaver, all of Cheshire, England

[73] Assignee: Imperial Chemical Industries PLC, Great Britain

[21] Appl. No.: 561,925

[22] Filed: Dec. 15, 1983

[30] Foreign Application Priority Data

Feb. 25, 1983 [GB] United Kingdom ............... 8305318

[51] Int. Cl.$^3$ .................. C04B 31/26; C04B 41/28
[52] U.S. Cl. .................... 106/121; 106/86; 106/118; 106/DIG. 3; 501/154; 252/378 R
[58] Field of Search ........... 106/86, 118, 121, DIG. 3; 501/154; 252/378 R

[56] References Cited

U.S. PATENT DOCUMENTS

| | | | |
|---|---|---|---|
| 4,130,687 | 12/1978 | Ballard et al. | 106/DIG. 3 |
| 4,269,628 | 5/1981 | Ballard et al. | 106/86 |
| 4,324,838 | 4/1982 | Ballard et al. | 106/86 |

FOREIGN PATENT DOCUMENTS

| | | |
|---|---|---|
| 0044160 | 1/1982 | European Pat. Off. . |
| 0044161 | 1/1982 | European Pat. Off. . |
| 0044178 | 1/1982 | European Pat. Off. . |
| 1016385 | 1/1966 | United Kingdom . |
| 1119305 | 7/1968 | United Kingdom . |
| 1585104 | 2/1981 | United Kingdom . |
| 1593382 | 7/1981 | United Kingdom . |
| 1597515 | 9/1981 | United Kingdom . |

*Primary Examiner*—Mark L. Bell
*Attorney, Agent, or Firm*—Cushman, Darby & Cushman

[57] ABSTRACT

A process for producing solid vermiculite products which are stable in water which comprises incorporating a source of ammonia or ammonium ions or a basic substance, preferably urea, in an aqueous suspension of vermiculite lamellae, shaping the suspension and removing water from the suspension by heating the shaped suspension at a temperature above 100° C., preferably above 150° C., such that ammonia or a basic substance is liberated within the suspension. The invention includes an aqueous suspension of vermiculite lamellae containing a source of ammonia or ammonium ions or a basic substance and a dry-powder mixture of vermiculite lamellae and a source of ammonia or ammonium ions or a basic substance.

16 Claims, No Drawings

PRODUCTION OF VERMICULITE PRODUCTS

This invention relates to a process for the production of solid vermiculite products which are stable in water and to vermiculite compositions suitable for the production of solid products which are stable in water.

It is known that granules of the layer mineral vermiculite can be chemically delaminated by treatment with aqueous solutions of salts followed by soaking in water and then mechanically shearing the swollen granules in water to form a suspension of extremely thin platelets known as vermiculite lamellae. Processes for the delamination of vermiculite are described, for example, in United Kingdom Patent Specification Nos. 1,016,385; 1,119,305 and 1,585,104.

It is also known, as is described for example in the above references, that the suspension of vermiculite lamellae obtained by chemical delamination of vermiculite can be used to form solid products such as sheets or papers and rigid foams of cellular structure by shaping the suspension and removing water from it; in the case of rigid foams the suspension is gasified prior to the removal of water from it.

Solid products made as described above possess a degree of structural integrity resulting from the mutual attraction of vermiculite lamellae, but suffer from the disadvantage that they lack stability in liquid water and in fact disintegrate if exposed to water for prolonged periods. It has been proposed in United Kingdom Patent Specification No. 1,016,385 to render vermiculite sheet products water-stable by treating the sheet subsequent to its formation with an aqueous solution of an electrolyte, for example magnesium chloride, and thereafter removing the water from the treated sheet. It has also been proposed in United Kingdom Patent Specification No. 1,597,515 to impart water-stability to vermiculite products by treating the products after their formation with ammonia or with the vapour of an amine. These post-treatments of vermiculite products do result in an improvement in the water-stability of the products but it is clearly desirable to avoid the need for a post-treatment of products and to produce water-stable products directly.

A process for producing water-stable vermiculite products directly by incorporating in the suspension used to form the products a solid particulate additive having a basic reaction in water, preferably an oxide or hydroxide of calcium or magnesium, is described in United States Patent Specification No. 4,269,628. The product obtained using this process has excellent water-stability and in addition exhibits improved strength compared with products not including the additive. However, the process suffers from the disadvantage that the suspension tends to flocculate on addition of the additive and moreover has a limited shelf-life after incorporation therein of the additive such that it needs to be shaped quickly, preferably immediately, into the desired product form.

The present invention resides in a process for the production of water-stable vermiculite products which obviates the disadvantages of the known process.

According to the invention there is provided a process for the production of solid vermiculite products which are stable in water which comprises shaping an aqueous suspension of vermiculite lamellae and removing water from the suspension wherein prior to removal of water from the suspension there is incorporated in the suspension a source of ammonia or ammonium ions or a basic substance and wherein during removal of water from the suspension the shaped suspension is heated at a temperature above 100° C. such that ammonium or a basic substance is liberated within the suspension.

Large amounts of urea as the source of ammonia (ammonium ions) or a basic substance can be incorporated without causing flocculation of the suspension. Nevertheless other sources may be used if desired, for example succinamide, hexamethylene tetramine (commonly called hexamine) and ethanolamine. The source may be one which is hydrolysed to yield ammonium ions in the suspension, for example urea, or it may be one which resists hydrolysis and decomposes upon heating to liberate ammonia directly, for example succinamide.

By the term "vermiculite" as used herein we mean all minerals known commercially and mineralogically as vermiculite or as containing vermiculite-type layers, for example chlorites and chlorite vermiculites.

By the term "vermiculite lamellae" we mean tiny particles of chemically delaminated vermiculite that are platelets having a thickness of less than one tenth of a micron, usually less than one hundredth of a micron, and an aspect ratio (length of breadth÷thickness) of at least 10, preferably at least 100 and more preferably at least 1000.

Since urea is the preferred source of ammonium ion (and subsequently of ammonia) or a basic substance the invention will be described hereinafter with respect to urea, but it is to be understood that this is not intended to limit the invention to the use of urea only.

The urea can be incorporated in the suspension at any stage during production or use of the suspension. Usually the urea will be added to a pre-formed suspension since this is the most convenient method of operation, but if desired it can be added to the swollen vermiculite granules in water before these are delaminated by shearing so that the urea is incorporated during production of the suspension. In the case where the suspension is gasified to form a wet foam or froth prior to forming a dry rigid foam product, the urea can be incorporated prior to, during or subsequent to gasification of the suspension. However since addition of the urea to the suspension does not seriously impair the stability, shelf-life or capability for gasification of the suspension, the urea is most conveniently incorporated in the suspension prior to gasification thereof.

The urea may be added directly in solid form to the suspension or it may be added as a solution in water. Urea and its solutions are essentially neutral and we have found that large amounts can be incorporated in the suspension of vermiculite lamellae without causing immediate or rapid flocculation of the suspension. Moreover the suspension incorporating the urea is stable and can be stored for prolonged periods, for example several months, without flocculation.

Suspensions of vermiculite lamellae can be prepared by dispersing in water vermiculite lamellae in the form of a free-flowing dry powder or tablets obtained by compacting dry or damp powder for ease of handling and transport. In this case, the urea required in the suspension can be mixed with the vermiculite powder and a feature of the present invention comprises a free-flowing dry powder composition comprising a mixture of vermiculite lamellae and a source of ammonia or ammonium ions or a basic substance. Tablets formed by compacting the mixed powders are also provided.

An aqueous suspension of vermiculite lamellae having a source of ammonia or ammonium ions or a basic substance incorporated therein is another feature of the present invention.

The amount of urea incorporated in the suspension will usually be in the range of from 1% to 30%, preferably 2% to 20% by weight and typically from 4% to 10% by weight based on the weight of vermiculite in the suspension, although amounts outside this range may be employed if desired. In general, however, we have observed that whilst amounts of less than 2% by weight do produce a water-stabilising effect, such amounts tend to result in a product of unsatisfactory water-stability for most practical applications and that there is little value in using an amount greater than 20% or even 10% by weight based on the vermiculite in the suspension. The amount of vermiculite in the suspension may vary within a wide range but typically will be from 0.5% to 50%, usually 10% to 25% by weight of the suspension. Suspensions containing a high proportion of vermiculite lamellae, if desired stabilised by incorporation of a deflocculating agent, may be viscous liquids or paste-like compositions and it is to be understood that the term 'suspension' as used herein includes such viscous compositions. A viscosity-modifying agent such as sodium pyrophosphate may be incorporated in the suspension so that the suspension is mobile and pourable even when it contains a high proportion, for example 35% by weight, of vermiculite lamellae.

It is preferred that at least the major proportion of the vermiculite lamellae in the suspension be of size below 50 microns, preferably below 20 microns, and if desired the suspension of vermiculite lamellae may be classified by elimination of particles of size greater than 50 microns (20 microns) before the suspension is converted into a shaped solid product. Classification of suspensions of vermiculite lamellae is known and is described for example in our United Kingdom Patent Specification No. 1,593,382.

Removal of water from the aqueous suspension of vermiculite lamellae to form solid products is mainly by evaporation assisted by heating, for example microwave heating. In the present invention the suspension is heated at a temperature sufficient to liberate ammonia gas or the desired basic substance within the suspension as its dries and in particular the suspension is heated at a temperature greater than 100°. Usually the temperature will be above 120° C., preferably above 150° C., since at lower temperatures the time for which it is necessary to heat the product to ensure that the inner regions are rendered water-stable may be unduly long, for example several hours or even days depending upon the thickness of the product. We especially prefer to employ temperatures of at least 200° C. in order to raise the temperature of the drying suspension/product rapidly and to ensure that the interior of the suspension/product reaches a temperature at which ammonia gas or a basic substance is liberated. If desired the suspension/product may be heated under an increased pressure but this will not generally be necessary.

A wide variety of forms of vermiculite products may be rendered water-stable by the treatment of the invention, including for example sheets and papers, rigid foams, mouldings and coatings. Product forms comprising substrates impregnated and/or coated with vermiculite are included and one particular product form of this type is a composite material comprising fibres and vermiculite lamellae as described in European Patent Publication Nos. 44160A1, 44161A1 and 44178A2. The fibres may be natural fibres or man-made fibres, organic or inorganic and the composites may be individual fibres coated with vermiculite or an assembly of fibres such as a woven, knitted or felted fabric or tissue impregnated with and/or coated with vermiculite. A lightweight three-dimensional product of foam-like structure (although not a true foam) comprising an assembly of fibres coated with vermiculite is another specific embodiment of a composite material which can be provided by the process of the invention. Laminates of a vermiculite-containing product form such as a sheet, foam or fibrous composite with a substrate such as a polymer or plastics film, metal, wood and concrete are also provided.

It will be appreciated from the product forms described that by shaping the aqueous suspension of vermiculite lamellae we include operations such as applying the suspension as a coating to substrates, impregnating substrates with the suspension and using the suspension as an adhesive as well as more obvious shaping operations such as casting and moulding.

The suspension may, if desired, contain other additives, for example fillers and especially lightweight or reinforcing fillers such as silica, fibre (e.g. glass fibres) glass micro-balloons (e.g. "Cenospheres" or "Ecospheres") perlite, kaolin, and flyash.

The invention is illustrated but in no way limited by the following examples in which the vermiculite suspensions employed were aqueous suspensions of vermiculite lamellae classified by elimination of particles of size greater than 50 microns and produced by the following general procedure:

Production of vermiculite suspensions 150 parts of vermiculite ore (Mandoval micron grade ex-South Africa) are agitated with saturated sodium chloride solution in 1:2 ratio in a tank for 30 minutes at 80° C. This suspension is then centrifuged and washed with deionised water. The wet cake is transferred to a second tank where the vermiculite is stirred with 1.5N n-butylamine hydrochloride (2:1 liquid:solid ratio) for 30 minutes at 80° C. This suspension is then centrifuged and washed with deionised water before transferring the wet cake to a swelling tank in which the vermiculite is stirred in deionised water. After swelling the suspension is approximately 20% solids and the particles random sized in the range 300–400 micron. This suspension is then passed through a stone-type mill which reduces at least 50% of the particles to less than 50 microns. This milled suspension is classified in a weir-type centrifugal classifier and the lighter particles with seive size less than 50 microns collected for use. Analysis of this 18–21% solids suspension by photosedimentometer and disc centrifuge reveals approximately 40% particles having a size ("equivalent spherical diameter") of 0.4–1.0 micron. The solids content of the suspension is readily adjusted by adding water to it or removing water from it.

EXAMPLE 1

Sodium pyrophosphate and Manoxol OT (a surface active agent-dioctyl ester of sodium sulphosuccinic acid) were stirred into an 18.8% by weight solids content vermiculite suspension to provide 0.3% by weight sodium pyrophosphate and 0.3% by weight Manoxol OT based on the weight of vermiculite in the suspension.

Urea was dissolved in a portion of the suspension in an amount of 8% by weight based on the vermiculite in the suspension.

The suspension was applied to glass fibre tissue by a knife-on-roll technique using a knife-tissue gap such as to provide a vermiculite loading on the tissue of about 100 g/m² and a coating of thickness approximately 0.1 mm. The wet, coated tissue was dried by passage through an air oven heated at 230° C. by gas heaters, using a 6 m oven and a speed of travel of the tissue of 2 m/min.

Squares of size 10 cm were cut from the dried coated tissue and weighed. Two weighed squares were then soaked in tap water overnight, after which they were rinsed in fresh water, wiped with paper towels, re-rinsed with water, dried and re-weighed.

For purposes of comparison, a portion of the suspension containing 0.3% by weight sodium pyrophosphate and 0.3% by weight Manoxol OT, but not containing urea, was coated by the knife-on-roll technique onto a sample of the glass fibre tissue. Squares were cut from the dried tissue and treated with water as above. Results:

| Sample | Urea (% by weight) | Weight 1 | Weight 2 | % Weight loss |
|---|---|---|---|---|
| I | 8 | 99.1 | 93.6 | 5.5 |
| II | 8 | 111.4 | 104.6 | 6 |
| II | 0 | 105.5 | 51.5 | 51 |
| IV | 0 | 105.5 | 51.3 | 51 |

Weight 1 is the weight in gm of the vermiculite in the coated tissue before the treatment in water. Weight 2 is the weight in gms of the vermiculite in the tissue after the treatment in water.

Visual inspection of the samples after the treatment in water showed that the coatings on the samples prepared using urea in the suspension appeared completely unaffected by the treatment whilst the coatings prepared in the absence of urea had virtually completely disintegrated; the loss in weight of vermiculite in these samples was greater than 50%.

EXAMPLE 2

A vermiculite suspension of 18.8 by weight vermiculite content and containing 0.3% Manoxol OT and 0.3% sodium pyrophosphate based on the vermiculite was prepared and urea was dissolved in portions of the suspension in the amount shown in the Table below.

The various suspensions were applied separately to an E-glass fibre tissue mat by the knife-on-roll technique described in Example 1, and 10 cm squares of the coated tissue were dried by heating in an oven at the temperature and for the time shown in the Table.

The squares of dry, coated tissue were weighed, immersed in water overnight, rubbed with a towel, dried and re-weighed. The results are shown in the Table. A visual assessment of the samples after the treatment was made to assess the coating; in the Table "A" denotes that the coating was hard and intact and appeared perfect and "B" denotes that over greater than 90% of its area of the coating appeared perfect but a few small patches were noted where the coating had rubbed off.

TABLE

| Expt No | % Urea | Drying temp °C. | Drying time (mins) | % wt. loss | Rating |
|---|---|---|---|---|---|
| 1 | 5 | 130 | 30 | 8 | A |
| 2 | 2.5 | 150 | 40 | 1.6 | A |
| 3 | 5 | 150 | 20 | 8 | A |
| 4 | 5 | 150 | 10 | 6.5 | B |
| 5 | 5 | 150 | 40 | 1.5 | A |
| 6 | 8 | 150 | 10 | 8 | A |
| 7 | 8 | 150 | 20 | 5 | A |
| 8 | 8 | 150 | 40 | 2 | A |
| 9 | 8 | 150 | 60 | 3 | A |
| 10 | 2.5 | 180 | 10 | 4.5 | B |
| 11 | 2.5 | 180 | 20 | 1.5 | B |
| 12 | 5 | 180 | 3 | 4 | A |
| 13 | 5 | 180 | 5 | 5 | A |
| 14 | 8 | 180 | 3 | 4 | B/A |
| 15 | 8 | 180 | 5 | 8 | B |
| 16 | 8 | 180 | 6 | 3 | A |
| 17 | 2.5 | 200 | 5 | 5 | B |
| 18 | 5 | 200 | 5 | 3 | B |
| 19 | 8 | 200 | 1 | 7 | A |
| 20 | 8 | 200 | 5 | 3 | A |
| 21 | 2.5 | 230 | 1 | 2.5 | A |
| 22 | 5 | 230 | 1 | 1.5 | A |
| 23 | 8 | 230 | 0.5 | 5 | A |
| 24 | 8 | 230 | 1 | 8 | A |

For purposes of comparison, 10 cm squares of tissue coated with the same suspension except that urea was excluded were dried by heating at the temperatures shown in the Table for the longest period at each temperature shown in the Table. In the water-stability test the coating on each of these comparative samples virtually disintegrated in water and were completely removed by rubbing; the loss in weight of vermiculite in all of these samples was in excess of 80%.

EXAMPLE 3

A vermiculite suspension (18.8% vermiculite) was prepared containing Manoxol OT (0.3% by weight), sodium pyrophosphate (0.3% by weight) and succinamide (10% by weight), based on the weight of vermiculite. The succinamide was insoluble in water and was dispersed in the suspension by stirring. The suspension was coated onto a glass-fibre tissue mat using a knife-on-roll to give a loading of vermiculite of about 100 g/m². The coated tissue was heated at 200° C. for 10 minutes after which a 10 cm square of the dried tissue was immersed in water overnight. The square was then wiped, rinsed, dried and re-weighed. The loss in weight of vermiculite was less than 10% and the coating on the treated sample remained hard and intact.

EXAMPLE 4

Vermiculite suspensions (18.8% vermiculite were prepared containing 0.3% by weight Manoxol OT, 0.3% by weight sodium pyrophosphate and respectively 2.9% by weight and 5.8% by weight hexamine (hexamethylene tetramine) based on the weight of vermiculite. The suspensions were coated onto E-glass tissue mat by the knife-on-roll technique to provide vermiculite loadings of about 100 g/m². 10 cm squares were out from the coated tissues and heated at the temperature and for the time shown below. The dry samples were weighed, immersed in water overnight, wiped, re-rinsed, dried and re-weighed. The loss in weight of vermiculite in the samples was determined.

| Expt No | % Hexamine | Drying Temp (°C.) | Drying Time (mins) | Wt. loss (%) |
|---|---|---|---|---|
| 1 | 2.9 | 150 | 5 | 2 |
| 2 | 5.8 | 125 | 10 | 8 |
| 3 | 5.8 | 150 | 5 | 5 |
| 4 | 2.9 | 175 | 2 | 3 |
| 5 | 5.8 | 175 | 2 | 1.5 |
| 6 | 2.9 | 200 | 1 | 0.5 |
| 7 | 5.8 | 200 | 1 | 2 |

We claim:

1. A process for the production of solid vermiculite products which are stable in water which comprises shaping an aqueous suspension of vermiculite lamellae and removing water from the suspension wherein prior to removal of water from the suspension there is incorporated in the suspension a source of ammonia or ammonium ions and wherein during removal of water from the suspension the shaped suspension is heated at a temperature greater than 100° C. such that ammonia or ammonium ions is liberated within the suspension.

2. A process as claimed in claim 1 wherein the source of ammonia or ammonium ions is urea.

3. A process as claimed in claim 1, wherein the amount of the source of ammonia or ammonium ions is from 2% to 20% by weight based on the weight of vermiculite in the suspension.

4. A process as claimed in claim 3 wherein the amount of the source is from 4% to 10% by weight based on the weight of vermiculite.

5. A process as claimed in claim 1 wherein the major proportion of the vermiculite lamellae in the suspension are of size below 50 microns.

6. A process as claimed in claim 1 wherein the temperature at which the suspension is heated is greater than 120° C.

7. A process as claimed in claim 6 wherein the temperature is greater than 150° C.

8. A process as claimed in claim 7 wherein the temperature is at least 200° C.

9. A suspension of vermiculite lamellae in a liquid medium containing a source of ammonia or ammonium ions.

10. A suspension as claimed in claim 9 which is an aqueous suspension.

11. A suspension as claimed in claim 9 or claim 10 wherein the source of ammonia or ammonium ions is urea.

12. A suspension as claimed in claim 9, wherein the amount of the source is from 2% to 20% by weight based on the weight of vermiculite in the suspension.

13. A suspension as claimed in claim 9 wherein the majority of the vermiculite lamellae are of size below 50 microns.

14. A dry-powder composition comprising vermiculite lamellae and a source of ammonia or ammonium ions.

15. A powder composition as claimed in claim 14 comprising vermiculite lamellae and urea.

16. Tablets formed by compacting the powder composition claimed in claim 14 or claim 15.

* * * * *